United States Patent

Ress, Jr. et al.

(10) Patent No.: US 9,121,351 B2
(45) Date of Patent: Sep. 1, 2015

(54) GAS TURBINE ENGINE ACCESSORY SYSTEM

(75) Inventors: Robert A. Ress, Jr., Carmel, IN (US); Todd Godleski, Fishers, IN (US)

(73) Assignee: Rolls-Royce North American Technologies, Inc., Indianapolis, IN (US)

( * ) Notice: Subject to any disclaimer, the term of this patent is extended or adjusted under 35 U.S.C. 154(b) by 1241 days.

(21) Appl. No.: 12/290,406

(22) Filed: Oct. 30, 2008

(65) Prior Publication Data

US 2010/0107650 A1     May 6, 2010

(51) Int. Cl.
| | |
|---|---|
| F02C 6/00 | (2006.01) |
| B64D 41/00 | (2006.01) |
| F02C 7/32 | (2006.01) |
| F02K 3/06 | (2006.01) |

(52) U.S. Cl.
CPC ... *F02C 7/32* (2013.01); *F02K 3/06* (2013.01); *F05D 2220/76* (2013.01); *F05D 2260/4031* (2013.01)

(58) Field of Classification Search
CPC ........ F02C 7/32; B64D 41/10; B64D 2041/02
USPC .............................................. 60/802; 244/58
See application file for complete search history.

(56) References Cited

U.S. PATENT DOCUMENTS

| | | | |
|---|---|---|---|
| 2,803,943 A | 8/1957 | Rainbow | |
| 3,543,588 A | 12/1970 | Richardson | |
| 3,688,560 A | 9/1972 | Broman et al. | |
| 3,860,330 A * | 1/1975 | Persson | 351/235 |
| 4,044,973 A | 8/1977 | Moorehead | |
| 4,497,171 A * | 2/1985 | Corrigan et al. | 60/805 |
| 5,435,124 A | 7/1995 | Sadil et al. | |
| 5,867,979 A * | 2/1999 | Newton et al. | 60/226.1 |
| 6,170,252 B1 | 1/2001 | Van Duyn | |
| 6,260,351 B1 | 7/2001 | Delano et al. | |
| 6,357,220 B1 | 3/2002 | Snyder et al. | |
| 6,447,248 B1 | 9/2002 | Kastl et al. | |

(Continued)

FOREIGN PATENT DOCUMENTS

| | | |
|---|---|---|
| EP | 0798454 A2 | 10/1997 |
| EP | 1911938 A1 | 4/2008 |

(Continued)

OTHER PUBLICATIONS

International Search Report and Written Opinion, PCT/US2009/952864, May 12, 2010, Rolls-North American Technologies, Inc.

(Continued)

*Primary Examiner* — Gerald L Sung
(74) *Attorney, Agent, or Firm* — Krieg DeVault LLP

(57) ABSTRACT

In one embodiment, a gas turbine engine may include an accessory system integrated in a frame between a bypass flow path and a core flow path. A shaft may be provided between the accessory system and a core shaft of the gas turbine engine. The integrated accessory system may include power devices such as motors and generators, among other types of devices. The gas turbine engine may have more than one device spaced at various circumferential locations. In one non-limiting example, two power devices may be spaced 180 degrees apart. In some embodiments, a shaft and gearing may be provided to a location such as a frame in preparation to receive a power device at a later time.

20 Claims, 8 Drawing Sheets

(56) References Cited

U.S. PATENT DOCUMENTS

| | | |
|---|---|---|
| 6,851,267 B2 | 2/2005 | Bruno et al. |
| 6,914,344 B2 | 7/2005 | Franchet et al. |
| 7,013,651 B2 | 3/2006 | Bruno et al. |
| 7,055,330 B2 | 6/2006 | Miller |
| 7,059,136 B2 | 6/2006 | Coffinberry |
| 7,484,354 B2 * | 2/2009 | Stretton .................. 60/226.1 |
| 8,042,341 B2 | 10/2011 | Charier et al. |
| 2005/0132693 A1 | 6/2005 | Macfarlane et al. |
| 2005/0215390 A1 * | 9/2005 | Poulin et al. .................. 475/331 |
| 2006/0010875 A1 | 1/2006 | Mahoney et al. |
| 2006/0101804 A1 | 5/2006 | Stretton |
| 2006/0225431 A1 | 10/2006 | Kupratis |
| 2006/0248900 A1 | 11/2006 | Suciu et al. |
| 2006/0260323 A1 | 11/2006 | Moulebhar |
| 2007/0084216 A1 | 4/2007 | Mazeaud et al. |
| 2007/0137219 A1 | 6/2007 | Linet et al. |
| 2007/0151258 A1 | 7/2007 | Gaines et al. |
| 2007/0283910 A1 | 12/2007 | Keller et al. |
| 2008/0148881 A1 | 6/2008 | Moniz et al. |
| 2009/0007568 A1 * | 1/2009 | Eccles et al. .................... 60/787 |
| 2009/0007569 A1 | 1/2009 | Lemmers, Jr. et al. |
| 2009/0175716 A1 * | 7/2009 | Vetters .......................... 415/144 |
| 2009/0223052 A1 * | 9/2009 | Chaudhry et al. ........... 29/889.2 |
| 2009/0290976 A1 | 11/2009 | Suciu et al. |

FOREIGN PATENT DOCUMENTS

| | | |
|---|---|---|
| GB | 1127659 A | 9/1968 |
| WO | WO 95/02120 A1 | 1/1995 |

OTHER PUBLICATIONS

European Examination Report, EP09840551.7, Dec. 9, 2013.

* cited by examiner

GAS TURBINE ENGINE ACCESSORY SYSTEM

FIELD OF THE INVENTION

The present invention generally relates to gas turbine engine accessory systems, and more particularly, but not exclusively, to the location of integrated accessory systems.

BACKGROUND

Placement of accessory systems for gas turbine engines remains an area of interest for airframers, gas turbine engine manufacturers, and operators alike. Some existing systems have various shortcomings, drawbacks, and disadvantages relative to certain applications. Accordingly, there remains a need for further contributions in this area of technology.

SUMMARY

One embodiment of the present application is a unique accessory system for a gas turbine engine. Other embodiments include unique apparatuses, systems, devices, hardware, methods, and combinations for accessory systems. Further embodiments, forms, features, aspects, benefits, and advantages of the present application shall become apparent from the following description and drawings.

DETAILED DESCRIPTION OF REPRESENTATIVE EMBODIMENTS

Figure 1:
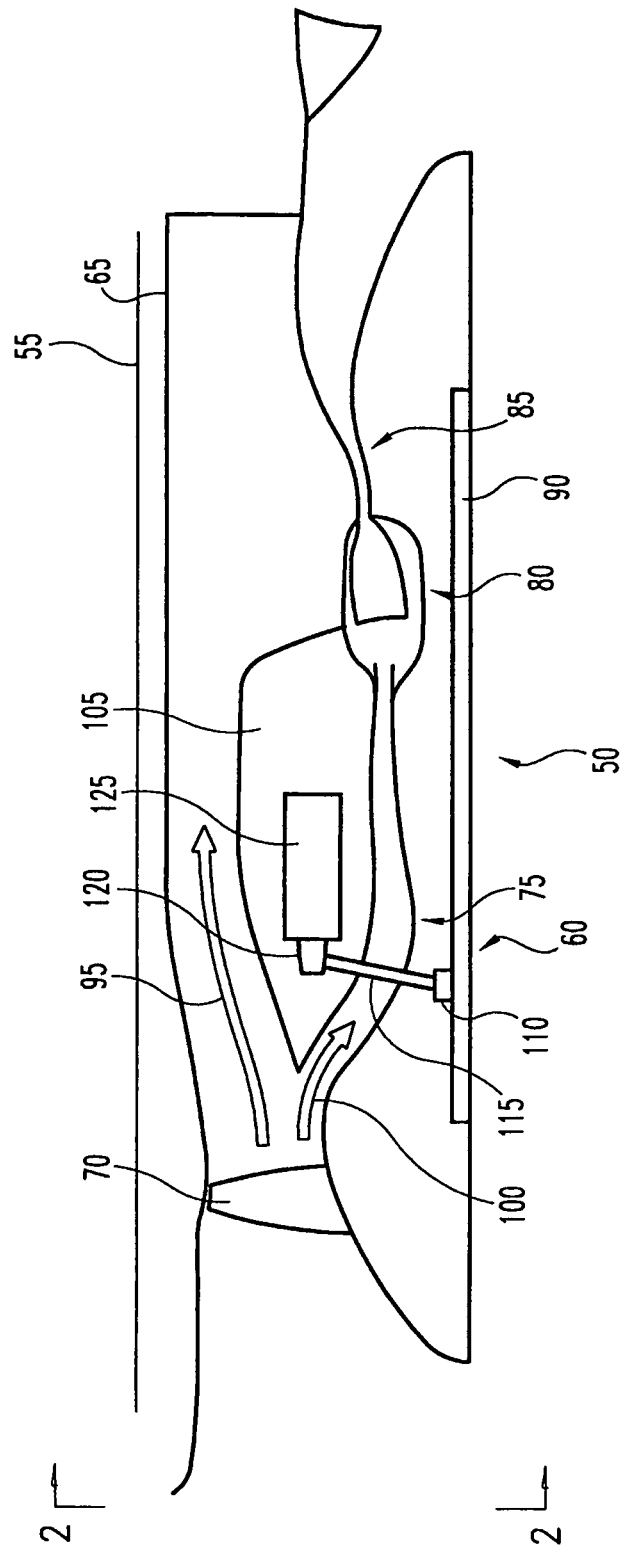
FIG. 1 is a cross sectional view of one embodiment of a gas turbine engine.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Figure 2:
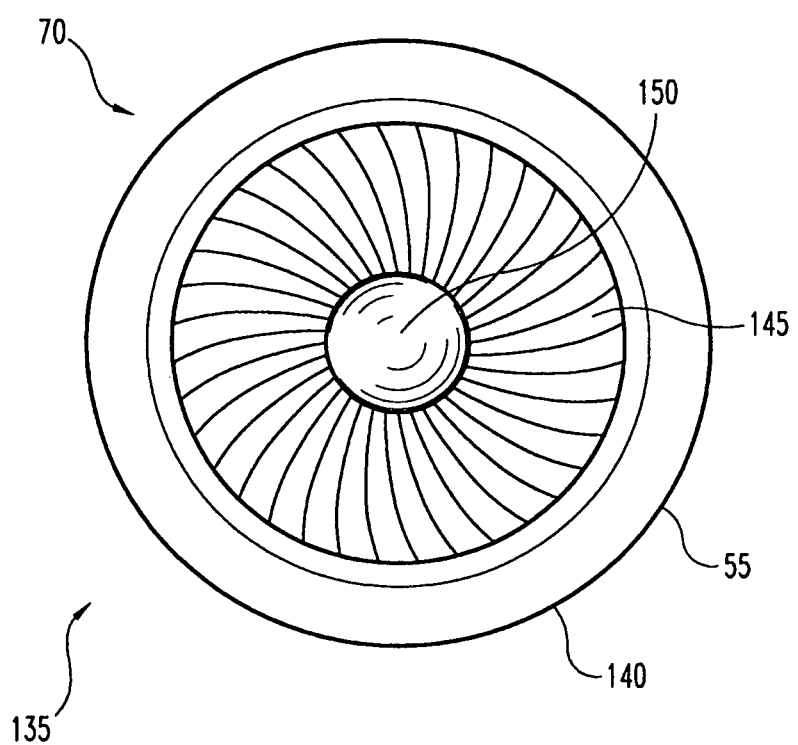
FIG. 2 is a front view of one embodiment of a gas turbine engine.

FIGS. 1 and 2 discloses one embodiment of a gas turbine engine 50 which is enclosed by a nacelle 55 and furthermore includes an integrated accessory system 60 for transmitting power between and among components of the engine. In the illustrated form the gas turbine engine 50 includes a casing 65, a fan 70, a compressor 75, a combustor 80, and a turbine 85 which together may be useful as an aircraft power plant. The term "aircraft" includes, but is not limited to, helicopters, airplanes, unmanned space vehicles, fixed wing vehicles, variable wing vehicles, rotary wing vehicles, hover crafts, and others. Further, the present inventions are contemplated for utilization in other applications that may not be coupled with an aircraft such as, for example, industrial applications, power generation, pumping sets, naval propulsion, and other applications known to one of ordinary skill in the art. Mechanical power is transmitted from the turbine 85 to both the fan 70 and the compressor 75 via a shaft 90. In some embodiments, the shaft 90 may include two or more shafts that connect, among other things, a low pressure turbine to a low pressure compressor, and a high pressure turbine to a high pressure compressor. Other variations of the gas turbine engine 50 are also contemplated herein.

Various types of gas turbine engines can be used in the present application. For example, the gas turbine engine can be a turbofan, turboprop, turbojet, or turboshaft regardless of the types set forth in the various illustrations. The gas turbine engine 50 of the embodiment depicted in FIGS. 1 and 2 is a turbofan type and includes a bypass flow path 95 and a core flow path 100 disposed within the casing 65. The casing 65 can be any suitable housing used to at least partially enclose the gas turbine engine 50. The casing 65 can be an assembly in some embodiments and can also be a unitary construction in others. A frame 105 is disposed between the bypass flow path 95 and the core flow path 100 to provide a juncture in which the airflow downstream of the fan 70 is split between the core flow path 100 and the bypass flow path 95. The frame 105 can be disposed elsewhere in other embodiments. In one non-limiting form the frame 105 is a fan frame. The frame 105 can form part of a load path within the gas turbine engine 50. The core flow path 100 is directed to flow through the compressor 75, the combustor 80, and the turbine 85, while the bypass flow path 95 is routed around the same. Depending on the particular application, the ratio of mass flow traversing the bypass flow path 95 to the mass flow traversing the core flow path 100 can vary from relatively low to relatively high.

In one form the integrated accessory system 60 includes a gear box 110, a device shaft 115, a right angle gear set 120, and a power device 125 and is configured to provide, extract, transmit, and/or convert power to/from the gas turbine engine 50. As used herein, the terms "shaft" and "device shaft" are both used similarly to refer to any mechanical device that rotates about an axis and is used to transmit mechanical power. Also as used herein, the term "power" includes all forms of useful power such as mechanical or electrical, to set forth just two non-limiting examples. The gear box 110 is coupled with the shaft 90 using gearing such as a spiral bevel gear system, but it will be appreciated that other types of gearings can also be used. As used herein, the term "gearing" includes gear boxes, gear sets, and gears such as, but not limited to, sun gear, helical gear, bevel gear, crown gear, and worm gear and any portions or combinations thereof. In one form, the gear box 110 can be coupled to the shaft 90 via a clutch so that the integrated accessory system 60 can be selectively engaged with the shaft 90 during operation of the gas turbine engine 50. In some embodiments, the gas turbine engine can have multiple spools corresponding to varying pressure levels, such as, but not limited to, a low pressure (LP) spool or a high pressure (HP) spool. The integrated accessory system or subsystem can be coupled to any particular spool via appropriate gearing. In embodiments having multiple integrated accessory systems, any particular system or subsystem can be coupled to any of the spools. In still further embodiments, any given integrated accessory system can be connected to more than one spool. In a further embodiment, a power device may be coupled to any shaft connecting a compressor to a turbine.

The device shaft 115 is coupled to the gear box 110 and is configured to transmit rotational power. At least part of the device shaft 115 extends across the core flow path 100 and may be exposed to air flowing through the core flow path 100. In other implementations, the device shaft 115 can be housed within an enclosure (not shown) such as an aerodynamic fairing to reduce losses within the core flow path 100. The device shaft 115 can be made from a variety of materials, can include a variety of shapes, and is designed to withstand mechanical and thermal stresses typical of the envisioned applications.

The right angle gear set 120 is coupled to the device shaft 115 and is configured to connect rotational motion along the longitudinal axis of the device shaft 115 into rotational motion along another axis. To set forth just one non-limiting example, in the illustrative embodiment, the right angle gear set 120 receives rotational motion along an axis traverse to the flow path direction and converts it to rotational motion along an axis substantially parallel to the flow path. The right angle gear set 120 is disposed within the frame 105.

The power device 125 is disposed within the frame 105 and is configured to receive rotational power from the shaft 90 via the gear box 110, the device shaft 115, and the right angle gear set 120. In some embodiments, more than one power device can be disposed in the frame 105. The power device 125 can be a generator, a motor, or a motor-generator among other possible devices. In one embodiment, the power device 125 can be an all-electric start motor configured to supply sufficient energy to start the gas turbine engine 50. In other embodiments, the power device 125 can take the form of any number of mechanical or electrical systems such as instrumentation, computers, and/or sensors to set forth just a few non-limiting examples. In still other embodiments, the power device 125 can provide, extract, transmit, and/or convert power to/from the gas turbine engine 50.

In one form the power device 125 includes an elongate axis which can be oriented along, or in some forms parallel with, the flow path direction. Such a configuration can provide for more compact packaging within the frame 105. In other embodiments, it may not matter that a longitudinal axis of the power device 125 is configured parallel to the flow path. In one form, the right angle gear set 120 can be replaced by a gearing that does not provide for a right angle turn. For example, in some embodiments, the power device of an integrated accessory system can be oriented at any arbitrary angle relative to a tower shaft. In this way, the power device can be oriented parallel, perpendicular, or any other angle relative to the longitudinal axis of a tower shaft.

Locating the power device 125 in the frame 105 permits the nacelle 55 of the gas turbine engine 50 to be substantially free of protuberances caused by power devices external to the casing 65. For example, the power device 125 disposed outside of the casing 65 might require a bulge or protuberance in the nacelle to efficiently package the power device. Such a configuration may cause aerodynamic losses leading to increased aircraft drag. In some embodiments, the power device 125 may not need to be limited to placement in the frame 105. Various other locations internal to the casing 65 can be appropriate locations for the integrated accessory system 60.

FIG. 2 depicts a view of the gas turbine engine 50 along line 2-2 of FIG. 1. An inlet 135 includes the nacelle 55 and in the illustrative form is configured as a circular shape 140. Aerodynamic losses can be reduced in this configuration because the power device 125 need not be located radially outside of the casing 65 as discussed above. The nacelle 55 encloses the fan 70 of the gas turbine engine 50. Blades 145 of the fan 70 are shown disposed circumferentially around a hub 150.

Figure 3:
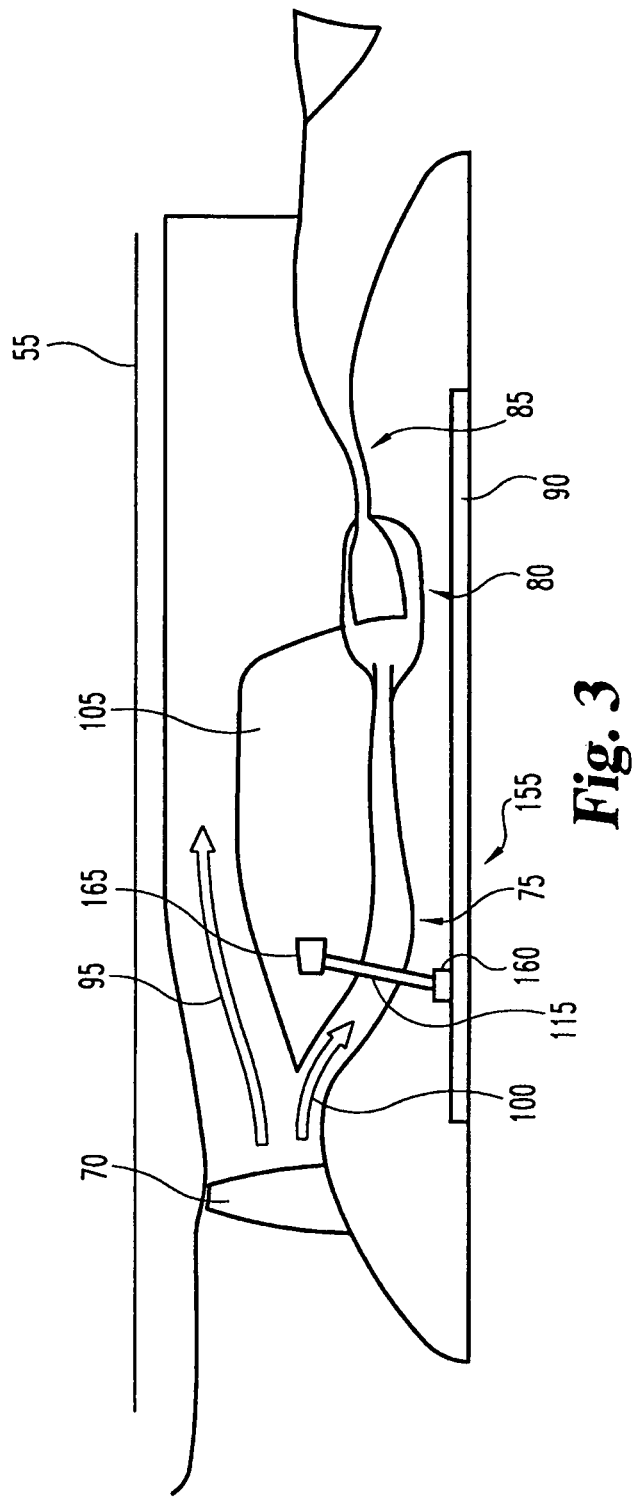
FIG. 3 is a cross sectional view of one embodiment of a gas turbine engine.

Referring now to FIG. 3, an integrated accessory subsystem 155 is shown coupled to the shaft 90. The integrated accessory subsystem 155 in the embodiment depicted in FIG. 3 is installed in the gas turbine engine 50 in anticipation of a later installation of a power device. In one form the integrated accessory subsystem 155 includes a first gearing 160, the device shaft 115, and a second gearing 165. The first gearing 160 and the second gearing 165 can include the gear box 110 or other types of gearing discussed hereinabove. The first gearing 160 couples the device shaft 115 to the shaft 90. The integrated accessory subsystem 155 of the embodiment depicted in FIG. 3 includes the second gearing 165 disposed within the frame 105, but it will be understood that the second gearing 165 can also be located at other locations within the casing 65. Power devices, such as, but not limited to a starter/generator, can then be added for some implementations and potentially removed and/or replaced in others. For example, the second gearing 165 can be provided having no power device coupled thereto when the gas turbine engine 50 is delivered to an operator or customer, who may subsequently choose to couple a power device thereto.

Figure 4:
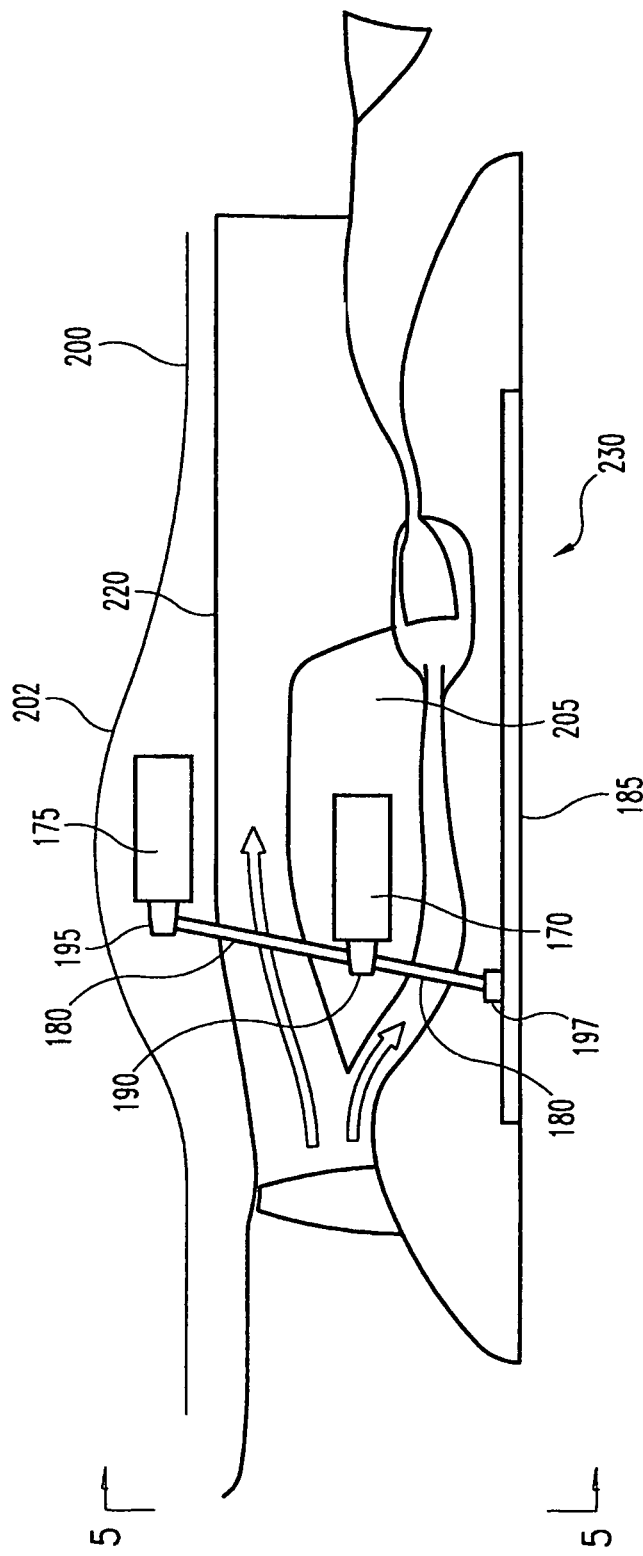
FIG. 4 is a cross sectional view of one embodiment of a gas turbine engine.
Figure 5:
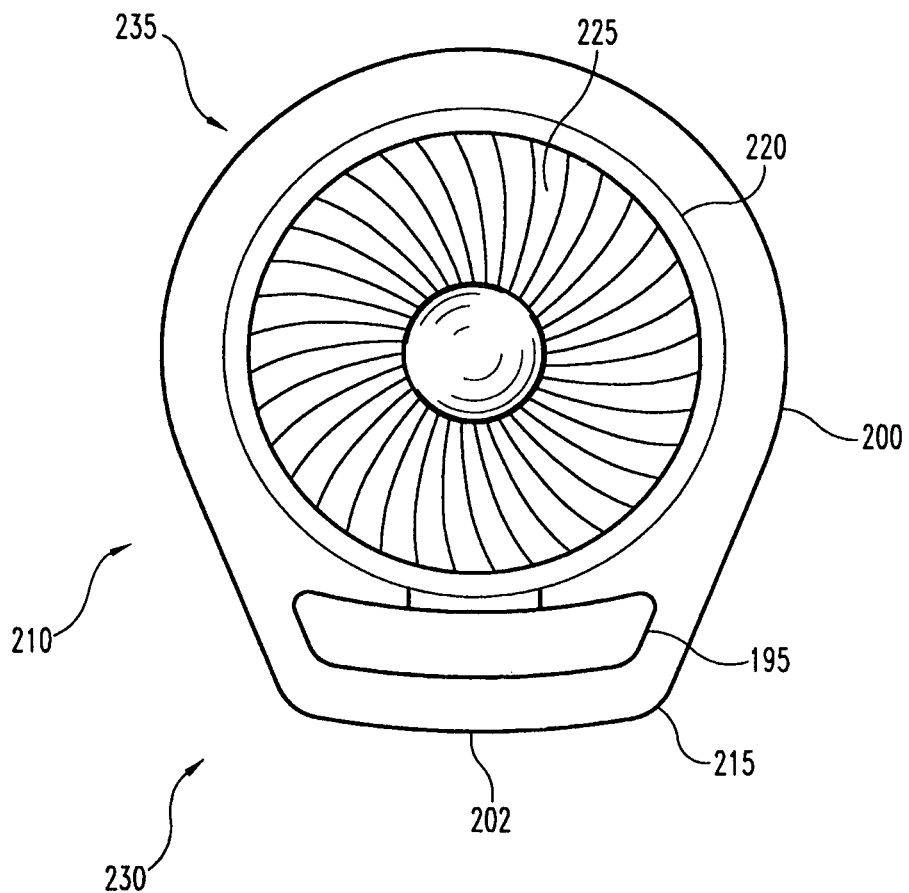
FIG. 5 is a front view of one embodiment of a gas turbine engine.

Referring now to FIGS. 4 and 5, a power device 170 and a power device 175 are shown coupled to a device shaft 180 and can be configured to operate independently or share power to/from a shaft 185. The power devices 170 and 175 need not be the same type of power device, and furthermore need not have the same size or packaging. The power devices 170 and 175 are coupled to the device shaft 180 through gearing 190 and 195, respectively. In one form, the device shaft 180 can include a first part traversing the core flow path and a second part traversing the bypass flow path. The device shaft 180 can also comprise other parts/components in other embodiments. The device shaft 180 is depicted as coupled to the shaft 185 through gearing 197. One or more separate clutch assemblies can be provided to selectively engage the power devices 170 and 175 to the device shaft 180 either collectively or independently. In addition, a clutch assembly can be provided to selectively engage the device shaft 180 to the shaft 185. A nacelle 200 in this configuration contains a bulge or protuberance 202, but it will be understood that the new gearing and power device system of the integrated accessory system is disposed within a casing, and in particular within the frame 205. In some embodiments, a gas turbine engine may be provided with gearing alone in the frame, and a power device can be provided at a later time. For example, in the embodiments having a tower shaft that extends across the core flow path and the bypass flow path, a power device can be provided on the external side of the engine casing, leaving the gearing in the frame to have a power device coupled at a later time.

An engine inlet 210 is depicted in FIG. 5 which corresponds to view 5-5 of FIG. 4. The engine inlet 210 includes the nacelle 200 configured as a non-circular shape 215 and is sized to accommodate the power devices 170 and 175. Blades 225 of a turbofan engine 230 are shown disposed circumferentially around a fan 235. In the illustrated embodiment, the nacelle 200 includes the non-circular shape 215, but it will be understood that the shape of the nacelle 200 can still be circular in some embodiments.

Figure 6:
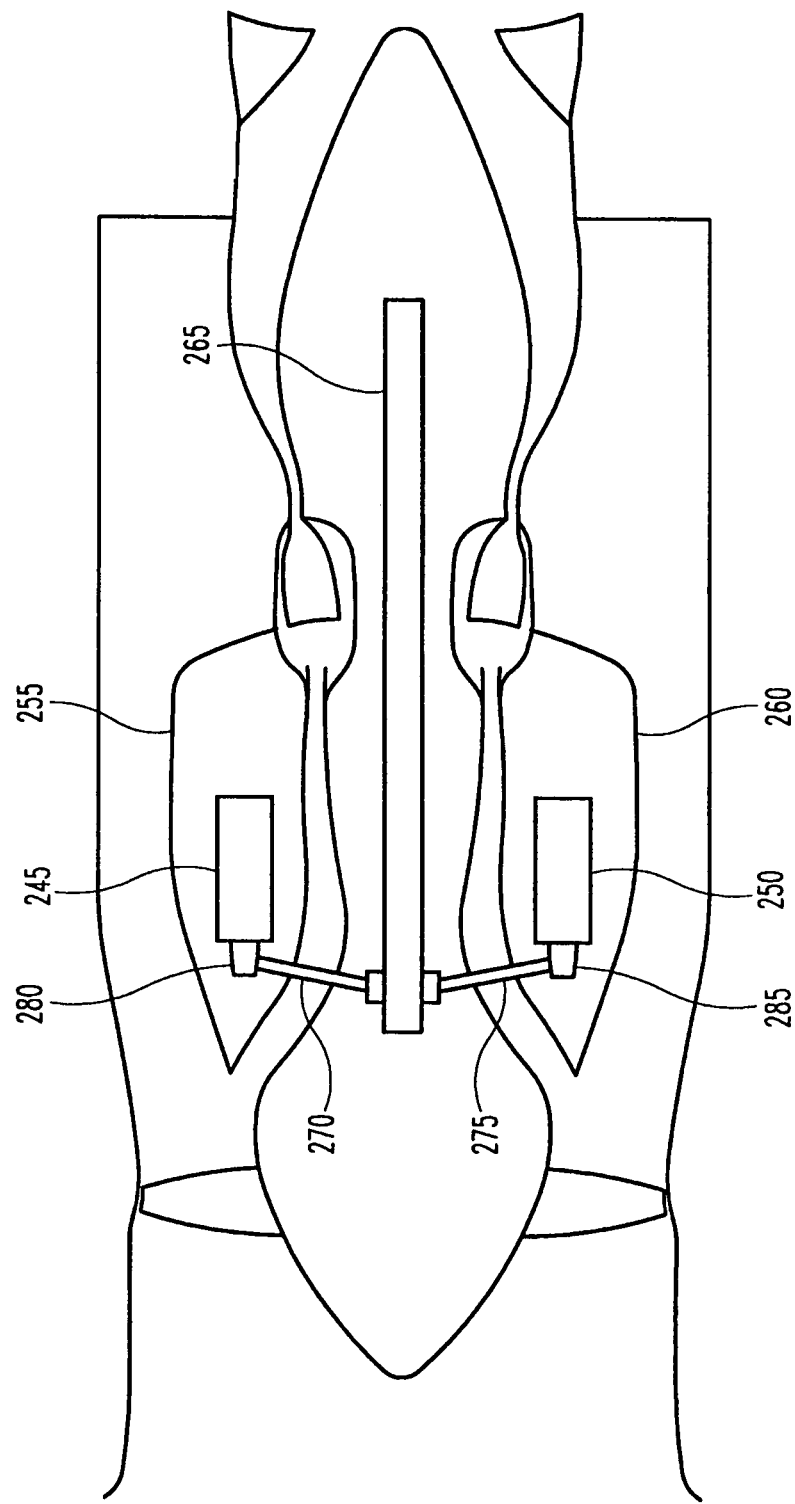
FIG. 6 is a cross sectional view of one embodiment of a gas turbine engine.
Figure 7:
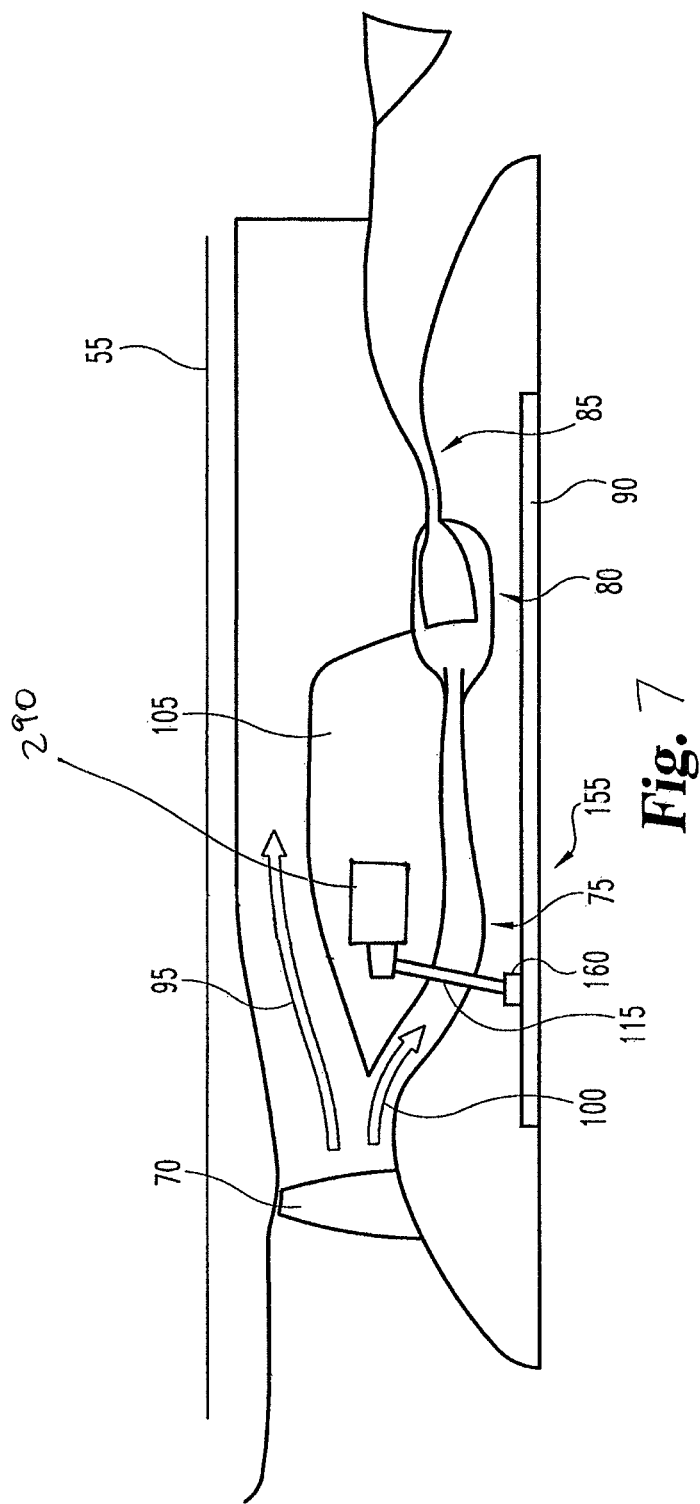
FIG. 7 shows a multi-pad accessory mount having circumferentially distributed devices.

Referring now to FIG. 6, another variation of the present application includes a power device 245 and a power device 250 disposed within frames 255 and 260. The frames 255 and 260 can be included in a larger, annular frame, or they may be individual frames located at distinct circumferential locations. The power devices 245 and 250 can be disposed 180 degrees from each other on opposite sides of the gas turbine. In other embodiments, multiple power devices can be positioned at a variety of circumferential locations and can be spaced at angles such as, but not limited to, forty-five degrees and ninety degrees. In further embodiments, any number of power devices can be disposed within the frame at multiple circumferential locations and at multiple radial locations. In embodiments having two or more circumferential locations in the frame where a power device can be located, one location can have a power device while the other location remains vacant, but otherwise configured with appropriate gearing to support a power device when needed. In embodiments having two or more circumferential locations of power devices, one location can have a power device while the other location has a multi-pad accessory mount. The power devices 245 and 250 are coupled to a shaft 265 through tower shafts 270 and 275, respectively. Gearing 280 and gearing 285 are provided in similar fashion as disclosed above.

In some forms, the gas turbine engine can have more than two flow paths where a power device can be disposed between any of the flow paths. The integrated accessory system or subsystem can be configured to connect to any number of multiple intermediate locations between the core shaft and the engine outer case, and may not necessarily be limited to placement in the frame.

Figure 8:
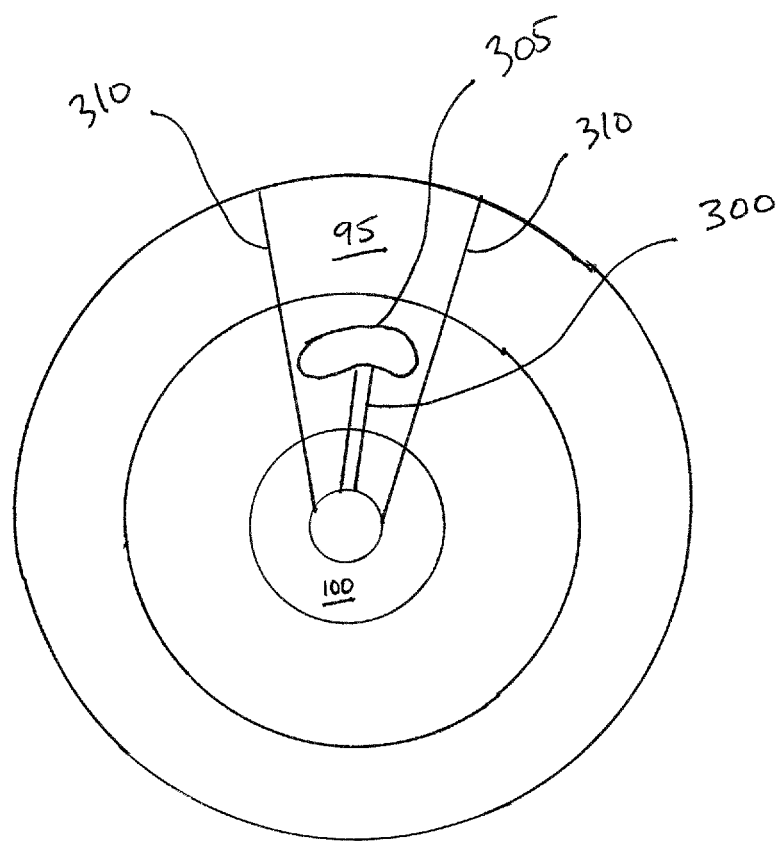
FIG. 8 is an embodiment of a multi-pad accessory mount in a fan frame.

In yet another form where traditional mechanically-driven accessories are desired, a multi-pad accessory mount may be incorporated into the frame with an integrated gearing (and embodiment of which can be seen in FIG. 8 with device shaft 300, multi-pad accessory 305, and fan frame 310). Multiple layshafts driven off a right angle gear set can provide a driving means at the accessory pad.

In another form, a power device can be selectively engaged to a power shaft such as when a clutch assembly is integrated into the integrated accessory system.

In forms with two or more power devices integrated in the frame, one device may be connected to a tower shaft that extends across only the core flow path while another device may be connected to a tower shaft that extends across both the core flow path and the bypass flow path.

One form of the present application includes a gas turbine engine that includes an integrated accessory system in a frame located between a core flow path and a bypass flow path. The integrated accessory system can include a power device. Locating a power device in the frame as opposed to locating it external to an engine case permits the gas turbine engine to be enclosed more efficiently within a nacelle. In some forms the nacelle may be circular in shape, thus leading to improvements in, among other things, aircraft drag reduction relative to a nacelle that contains a bulge or protuberance to accommodate an externally mounted power device. A new shaft and gearing system connects the integrated accessory system to a core shaft that is coupled between a turbine and a compressor. In some forms, the integrated accessory system can include a motor, a generator, or a motor-generator, among other possible devices.

Another form of the present application includes an apparatus comprising a gas turbine engine having a shaft operable to transmit mechanical power, a first flow path disposed internal to the gas turbine engine, a second flow path disposed radially inward of the first flow path in the gas turbine engine, and a gearing operably coupled to the shaft, and disposed between the first flow path and the second flow path wherein the gearing is operable to integrate with an accessory system.

Yet another form of the present application includes an apparatus comprising a gas turbine engine having an engine shaft and a core, the core including a compressor, combustor, and turbine, the gas turbine engine having a core flow path through the core and a bypass flow path operable to allow flow around the core, and a power device disposed between the core flow path and the bypass flow path, the power device operable to transfer power with the engine shaft.

Still another form of the present application includes an apparatus comprising a gas turbine engine having a shaft coupling a compressor and a turbine, the gas turbine engine also having a gas turbine engine casing, a power device disposed within the casing and between at least two flow paths, and means for transferring mechanical power between the power device and the shaft.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow. In reading the claims it is intended that when words such as "a," "an," "at least one," "at least a portion" are used there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. An apparatus comprising:
  a gas turbine engine having a shaft operable to transmit mechanical power;
  a first flow path disposed internal to the gas turbine engine and defined by an inner first flow path wall and an outer first flow path wall;
  a second flow path disposed radially inward of the first flow path in the gas turbine engine and defined by an inner second flow path wall and an outer second flow path wall;
  a gearing operably coupled to the shaft and disposed between the first flow path and the second flow path wherein the gearing is operable to integrate with an accessory system; and
  a multi-pad accessory mount disposed between the inner first flow path wall of the first flow path and the outer second flow path wall of the second flow path, the multi-pad accessory mount coupled to the gearing;
  wherein the multi-pad accessory mount is located in a fan frame of the gas turbine engine.

2. The apparatus of claim 1 wherein the shaft connects a compressor to a turbine and wherein the gearing is operably connected to the shaft by an accessory drive shaft that extends across the second flow path.

3. The apparatus of claim 2 wherein the accessory drive shaft extends across the first flow path and the second flow path.

4. The apparatus of claim 2 which further includes a power device disposed radially outward of the first flow path, the power device coupled to the accessory drive shaft.

5. The apparatus of claim 1 wherein the gearing is disposed within a frame of the gas turbine engine.

6. The apparatus of claim 1 which further includes a power device located between the first flow path and the second flow path, the power device coupled with the gearing.

7. The apparatus of claim 6 wherein the power device is an electro-mechanical device.

8. The apparatus of claim 6 wherein the power device is a generator, a motor, or a motor-generator.

9. The apparatus of claim 1 wherein the gearing provides a right angle drive.

10. The apparatus of claim 1 which further includes a second gearing coupled to the shaft and disposed between the first flow path and the second flow path.

11. The apparatus of claim 1 which further includes a towershaft having a first end and a second end, wherein the first end is coupled to the shaft and the second end is coupled to the gearing.

12. The apparatus of claim 1 which further includes a power device operably coupled to the shaft.

13. An apparatus comprising:
- a gas turbine engine having an engine shaft and a core, the core including a compressor, combustor, and turbine, the gas turbine engine having a core flow path through the core and a bypass flow path operable to allow flow around the core;
- a power device disposed between the core flow path and an inner boundary of the bypass flow path, the power device operable to transfer power with the core via the engine shaft;
- a second power device operably connected to the engine shaft, the second power device disposed between the core flow path and the bypass flow path;
- a multi-pad accessory mount disposed between an outer wall of the core flow path and an inner wall of the bypass flow path, the multi-pad accessory mount located in a fan frame of the gas turbine engine and coupled to the gearing; and
- wherein the second power device is located at a different circumferential location than the power device.

14. The apparatus of claim 13 wherein the power device is operable to receive power from the engine shaft.

15. The apparatus of claim 13 which further includes a frame disposed within the gas turbine engine, wherein the power device is disposed within the frame.

16. The apparatus of claim 13 wherein the power device is either a generator or a motor.

17. The apparatus of claim 13 which further includes a towershaft having a first end and a second end, wherein the first end is operably connected to the turbine and the second end is operably connected to the power device.

18. An apparatus comprising:
- a gas turbine engine having a shaft coupling a compressor and a turbine, the gas turbine engine also having a gas turbine engine casing;
- a power device disposed within the casing and between at least two flow paths; and
- means for coupling a plurality of power devices to a power shaft from the gas turbine engine shaft, the means for coupling located with and coupled to the power device, the means also located in a fan frame of the gas turbine engine.

19. The apparatus of claim 18 wherein the plurality of power devices are at different circumferential locations.

20. The apparatus of claim 18 wherein the means for coupling is oriented such that the plurality of devices are distributed circumferentially.

* * * * *